United States Patent

[11] 3,611,853

[72] Inventor Kurt Finsterwalder
 Goppingen, Germany
[21] Appl. No. 843,567
[22] Filed July 22, 1969
[45] Patented Oct. 12, 1971
[73] Assignee Messrs. L. Schuler GmbH
 Goppingen, Germany
[32] Priority July 25, 1968
[33] Germany
[31] P 17 79 268.6

[54] APPARATUS FOR CUTTING WORKPIECES TO LENGTH
 5 Claims, 4 Drawing Figs.
[52] U.S. Cl. .................................................. 83/126,
 83/136, 83/183, 83/185, 83/338, 83/519
[51] Int. Cl. ............................................... B23d 21/04
[50] Field of Search ........................................ 83/183,
 185, 338, 337, 322, 323, 552, 519, 411, 410, 267,
 136, 126

[56] References Cited
 UNITED STATES PATENTS
 1,364,271  1/1921  Gail .............................. 83/519 X 2,218,541  10/1940  Kronquest ...................... 83/322 X
 2,802,526  8/1957  Hillman ......................... 83/337 X Primary Examiner—James M. Meister
Attorney—Craig, Antonelli and Hill ABSTRACT: Apparatus for trimming to length deep drawn or extruded workpieces has a rotating transport member in the form of a hollow cylinder having a series of workpiece holders formed around its periphery at one end, the cylinder supporting for axial movement a ring of parallel punches associated one with each workpiece holder, the punches each being first projected forward in succession to engage a workpiece loaded into the associated workpiece holder at a loading station and to cooperate with a die so as to trim the workpiece, and then being retracted, by means of cam followers attached to the punches and engaging a camming slot formed in a stationary drum mounted within the hollow cylinder, the workpiece being stripped from the punch during its retractive movement. An ejector bolt is provided in a bore within each punch to commence the stripping operation at the commencement of the retractive movement.

INVENTOR
KURT FINSTERWALDER

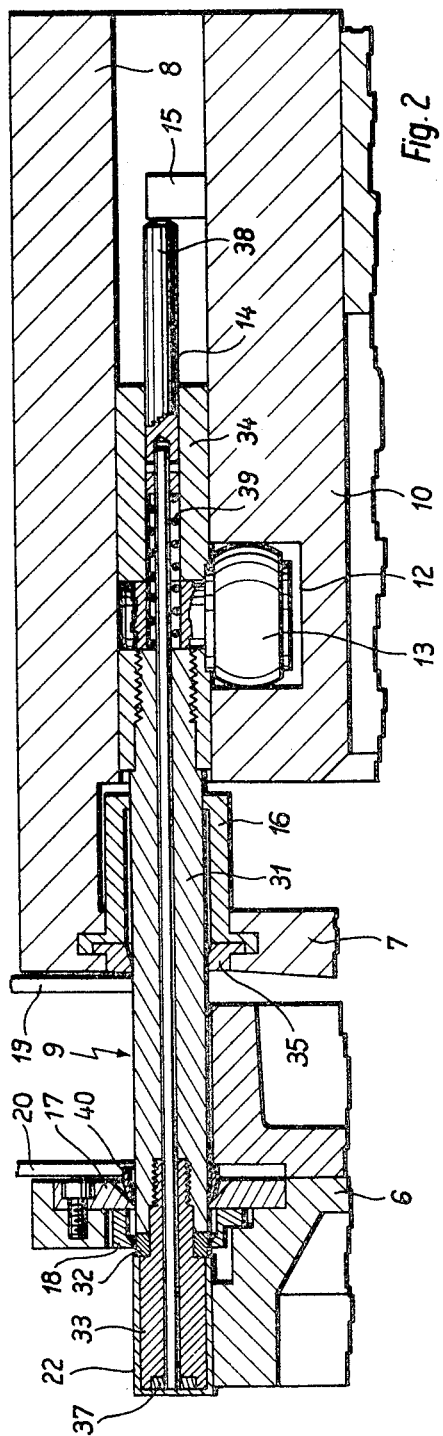
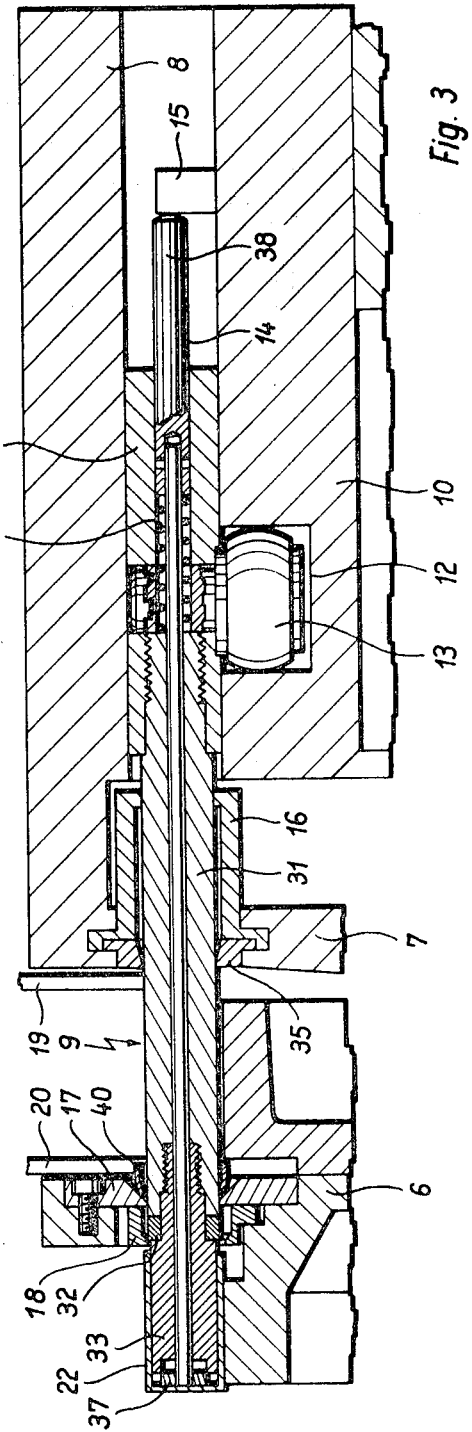

ABSTRACT

APPARATUS FOR CUTTING WORKPIECES TO LENGTH

Figure 1:
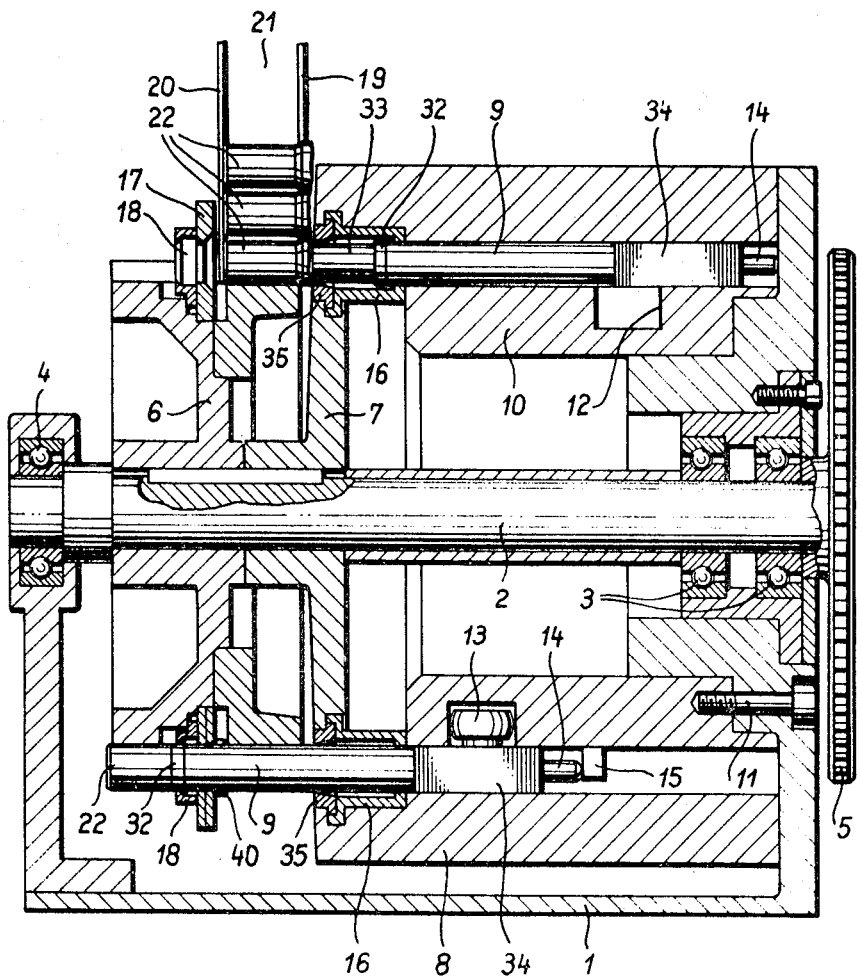

The invention relates to apparatus for cutting to length workpieces produced by deep drawing, or hot or cold extrusion.

Known apparatus of this type is in the form of a horizontal press, in which a punch forming part of a cutting tool performs a reciprocating movement. For each working stroke of the punch a workpiece to be cut to length is placed over the punch and cut to the desired dimension on being pushed through a die. A serious disadvantage of this arrangement is the low working speed imposed by the reciprocatory movement of the punch. If a plurality of punches are disposed side by side in order to increase the output of the machine, considerable space is required and the machine becomes complicated both in respect of the accessory apparatus for feeding and ejecting the workpieces to and from the punches and in respect of the reciprocatory drive, since the force required to carry out the cutting operation is increased in proportion to the number of punches; this complication leading to increased cost and liability to breakdown.

The primary object of the invention is to provide apparatus, which is compact and has an improved output, which achieves better outputs and requires little space, for cutting to length workpieces produced by deep drawing or hot or cold extrusion.

There is provided according to the invention apparatus for cutting to length workpieces produced by deep drawing or extrusion, comprising a transport element provided with a number of workpiece holders, the transport element being supported in a frame for such movement as will transport the workpiece holders successively through a workpiece-loading station and a workpiece discharge station, a plurality of cutting tools carried by the transport element, one in association with each workpiece holder, each cutting tool comprising an element supported for movement relative to the transport element into a workpiece cutting position, and means supported by the frame adapted to move each said cutting tool element into said workpiece-cutting position as the associated workpiece holder is transported between the workpiece-loading station and the workpiece discharge station. An advantage of the invention is that for each movement cycle of the transport element, several workpieces are cut to length, thus increasing output, since a plurality of cutting tools are operating simultaneously in phase displacement in relation to one another. By use of the invention, very simple loading and discharge of the workpieces is possible, since all the workpiece holders are loaded at the same loading station and all processed workpieces leave the apparatus at the same discharge station. The apparatus of the invention lends itself to a compact, space-saving construction. Furthermore, the maximum driving power required by the machine is no higher than in the operation of a machine having single cutting device, since the cutting tools perform the cutting one after the other in respect of time.

Preferably the cutting tools comprise punch and die sets.

According to a further feature of the invention, the transport element comprises a hollow cylinder which is closed at one end and is supported in the frame for rotation about its axis of symmetry, and the movable cutting tool elements are the punches and are supported in a ring by the wall of said cylinder, with their axes of movement parallel to each other and to the axis of rotation of the cylinder. In this manner a very simple and robust construction of the apparatus is obtained, a common camming track operating all the punches. No crankshafts and connecting rods or other parts producing and performing reciprocating movements are necessary. Only the punches themselves perform a reciprocating movement. Furthermore, there is a phase displacement of the movement of the punches in relation to one another and thus it can readily be ensured that two punches will never simultaneously perform a cutting operation and thus result in an undesirably high peak power consumption and peak stresses in the drive to the apparatus.

According to a further feature of the invention, the stationary member is a drum concentric with the hollow cylinder and bearing a continuous cam slot extending once round its periphery, said track having an axial excursion such as to cause a forward movement of the punch through its associated die and a corresponding retraction as the associated workpiece holder moves between the loading station and the discharge station. This arrangement obviates the need for springs to main contact between the cam followers and the track during return movement of the punches.

Preferably the drum is situated inside the hollow cylinder, thus making advantageous use of the space inside the cylinder and producing a very compact apparatus.

Preferably also the hollow cylinder is fast to and adapted to be driven by a central shaft. This shaft provides the sole drive to the apparatus and may either be connected to a drive motor or direct to an adjacent deep drawing or cold extrusion press supplying the workpieces to be trimmed.

The workpiece-loading station may comprise a guide fixed in relation to the frame adapted to feed workpieces to the workpiece holders in a radial direction relative to the transport element, thus minimizing the axial length of the apparatus.

According to yet a further feature of the invention, each punch is provided with an axial bore containing a longitudinally slidable bolt, extending from a head normally flush with the head of the punch to a tail portion extending from the other end of the punch, means being positioned relative to the cam drum so as to engage the tail portions of each bolt as the cam follower of its associated punch passes beyond the maximum forward excursion of the cam slot on rotation of transport member, whereby to initate stripping of a workpiece from the punch. A stripping ring may be mounted for limited radial floating movement on the remote slide of each die from the associated punch, said stripping ring being biased to a nonradial position wherein it will engage a workpiece partially stripped from the punch, and will complete the stripping of the workpiece from the punch.

Figure 4:
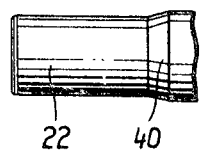

Further features and advantages of the invention will become clear from the following description, in which a preferred embodiment of the invention is described with reference to the accompanying drawing, in which:

FIG. 1 illustrates in simplified form, apparatus for cutting workpieces to length, partly in elevation and partly in section, FIGS. 2 and 3 are details in section showing the cutting tool at two points during its operating cycle, and FIG. 4 shows an untrimmed workpiece.

Referring to the drawing a central shaft 2 is mounted by means of roller bearings 3, 4 in a frame comprising a housing 1. At one end the shaft 2 carries a sprocket wheel 5, through which drive is applied to the shaft. Instead of the sprocket wheel 5 it is also possible to provide other forms of drive means, for example a gear or V-belt drive, or a drive motor may be flanged directly onto the housing and drive the shaft 2 directly. Towards the end of the shaft remote from the sprocket wheel 5 there are secured to the shaft 2 for rotation therewith an outer disc 6 and an inner disc 7, which close one end of a hollow cylinder 8 and form therewith a transport element. Around the internal periphery of the cylinder 8 are disposed, parallel to its axis, a ring of four punches in the form of rams 9, of which two can be seen in FIG. 1. Inside the hollow cylinder 8, which rotates with the shaft 2, is disposed a cam drum 10, which is likewise in the form of a hollow cylinder and which is rigidly connected by screws 11 to the housing 1. In the external surface of the cam drum 10 is cut a cam slot 12, which forms a continuous camming track extending once around the periphery of the drum. That part of the slot 12 which is situated nearest the inner disc 7 and that part of the slot 12 which is situated farthest from the inner disc 7 are situated an axial distance apart which corresponds to the desired stroke of the rams 9. Rollers 13 connected to the rams 9 run in the slot 12, whose axial excursion is such as to drive the rams through a complete forward movement and retraction on each rotation of the cylinder 9. The rams 9 are bored through longitudinally. Each bore contains a bolt 14 projecting outwards in the direction of the sprocket wheel 5. The cam drum 10 carries a flange 15, which cooperates with the bolts and is disposed on the periphery of the cam drum 10 in line with that part of the slot 12 which is nearest the inner disc 7. The inner disc 7 carries on its periphery, for each of the rams 9, a guide sleeve 16, while the outer disc 6 carries on its periphery, for each of the rams 9, a die 17. Adjacent each die 17 is a stripping ring 18 mounted so as to allow limited radial float. An inlet passage 21 bounded axially by two walls 19, 20 extends radially in respect of the discs 6, 7 and has its mouth adjacent the periphery of the discs 6 and axially in line with that part of the track 12 furthest from the disc 7, so that the rams 9 are fully retracted when in line with the mouth of the inlet passage, which forms a workpiece-loading station.

Since at this point the rams 9 are clear of the inlet passage 21, as the transport member rotates, the nearest of a stack of cup-shaped workpieces 22 held by the inlet passage is free to enter a workpiece holder 23 formed by a groove in the outer periphery of the disc 6 opposite each of the rams 9. On further rotation of the transport member, including the hollow cylinder 8, the ram 9 opposite the loaded workpiece holder is moved in the direction of the die 17 by the roller 13 moving in the slot 12. The end of the ram 9 thus slides into the workpiece 22, the open end of which is flared. On further movement of the ram the workpiece 22 is moved through the die until a peripheral cutting ring 32 to the rear of the leading end of the ram cooperates with a cutting edge on the die 17 and curs the workpiece to the desired length. The ram then continues to move in the same direction until it occupies approximately the position in which the bottom ram 9 is shown in FIG. 1. The ram then reverses its direction of movement. At this moment the bolt 14 begins to bear against the flange 15. The end of the bolt 14 remote from the flange is then situated approximately in the plane of the end face of the ram 9. As the ram 9 continues to retract on further rotation of the hollow cylinder 8, the end of the bolt 14 remote from the flange 15 projects from the end face of the ram and holds the cup-shaped workpiece fast in the outer position. As the ram 9 retracts the floating stripping ring drops over the edge of the cutting ring 32 of the ram and behind the cut edge of the workpiece 22. On still further rotation of the hollow cylinder 8, the bolt 14 slides past the stop 15 and is pulled back by a compression spring 39 (see FIGS. 2 and 3), until its end is once again approximately flush with the end face of the ram 9. During the remainder of the return movement of the ram, the workpiece 22 is stripped from the ram by the stripping ring 18, and falls out of the workpiece holder, the point where this occurs being termed the 'workpiece discharge station' in the appended claims. The ram reaches its fully retracted position approximately at or shortly before the moment at which the associated workpiece holder 23 again passes the mouth of the inlet passage 21. Between the passing of the workpiece holders 23 past the mouth of the inlet passage, the latter is closed by the outer periphery of the disc 6.

During each rotation of the hollow cylinder 8, each ram thus performs a complete working stroke. It is however also possible for the slot 12 to be so shaped that each ram performs two working strokes during its rotation. In addition, it is possible for any number of rams to be used. No difficulty arises in disposing six or eight or even more rams around the inner periphery of the hollow cylinder. The points during each revolution at which peak power must be applied through the shaft 2, i.e., when the individual rams effect cutting of a workpiece, are uniformly angularly distributed assuming that the rams are equiangularly distributed around the cylinder 8.

Each ram 9 has a body 31 the diameter of which corresponds approximately to the final outside diameter of the cup-shaped workpieces 22. The cutting ring 32, the cutting edge of which has approximately the same diameter as the outside diameter of the ram body 31, is centered and fastened on the latter by means of a screwed-in ram head 33. The outside diameter of the ram head 33 corresponds approximately to the internal diameter of the cup-shaped workpiece 22. The distance from the free end face of the ram head 33 to the cutting edge of the cutting ring 32 corresponds to the desired length of the cut workpiece 22. To the end of the ram body 31 remote from the ram head 33 there is fastened a sleeve 34 carrying the roller 13. The ram body is guided by the guide sleeve 16 and a ring 35, which are fastened to the inner disc 7. The die 17 is fastened on the outer disc 6 and is in line with the ring 35.

The entire ram 9 is bored through longitudinally. The bore houses the bolt 14, which is freely movable and which at its end remote from the ram head carries an end plate 37, the end face of which is flush with the end face of the ram head 33 when the bolt is in its normal position. At its end remote from the end plate 37 the bolt 14 carries an actuating pin 38, the free end of which cooperates with the flange 15. Between the pin 38 and the end of the ram body the bolt 14 is surrounded by a helical compression spring 39, which holds the bolt and the end plate 37 fastened to it in the position illustrated in FIG. 2, in which the end plate 37 does not project out of the plane of the end face of the ram head 33.

In its fully retracted position the ram is situated in a position in which one end face is approximately flush with the free end face of the ring 35, so that a workpiece 22 can enter the workpiece holder 23. When the ram 9 moves forward, it slides into the cup-shaped workpiece and drives it through the die. As the cutting edge of the cutting ring 32 passes the cutting edge of the die, the workpiece is sheared circumferentially, and a ring of scrap 40 remains on the ram body 31. When the ram has reached its fully extended position as illustrated in FIG. 2, after rotation of the hollow cylinder 8 through about 180° in relation to the inlet passage 21, the pin 38 engages the flange 15 and holds the bolt 14 and the end plate 37 fast to it against retraction as the ram begins to retract. As soon as the cutting edge of the cutting ring 32 has passed the stripping ring 18, the latter, by reason of its floating mounting, falls against the ram head. In the course of further retraction of the ram 9, the pin 38 reaches the end of the flange 15 and the compression spring 39 moves the bolt 14 and the end face 37 back into their normal positions, whilst the stripping ring 18 takes over the stripping of the cut workpiece 22 from the ram head 33. The ring 35 strips the waste ring 40 from the ram 9.

The workpiece 22 fed has, as already stated, an approximately cup-shaped form and at the point where it is to be sheared off is formed with a flare which facilitates the entry of the ram head into the workpiece and assists in determining the length to which the workpiece is to be cut.

It is obvious that the invention is not restricted to the example of embodiment illustrated, but that variations therefrom are possible without departing from the scope of the invention. Such variations may in particular arise through the utilization in some embodiments of the invention of certain of the features of the latter by themselves, or the use of a plurality of these features in any desired combination. In particular, the number of cutting tools may be selected as desired.

I claim:

1. Apparatus for cutting to length workpieces produced by deep drawing or extrusion, comprising a transport element provided with a number of workpiece holders and being supported in a frame for such movement as will transport the workpiece holders successively through a workpiece-loading station and a workpiece discharge station, a plurality of cutting tools carried by the transport element, one in association with each workpiece holder, each cutting tool comprising a punch supported for movement relative to the transport element into a workpiece-cutting position and a die, and means supported by the frame adapted to move each punch into said workpiece-cutting position as the associated workpiece holder is transported between the workpiece-loading station and the workpiece discharge station, wherein the transport element comprises a hollow cylinder which is closed at one end and is supported in the frame for rotation about its axis of symmetry, and the movable cutting tool elements are the punches and are supported in a ring by the wall of said cylinder, with their axes of movement parallel to each other and to the axis of rotation of the cylinder, wherein the means supported by the frame adapted to move the punches is a stationary member presenting a camming track, and each of the punches is provided with a cam follower cooperating with said track, wherein the stationary member is a drum concentric with the hollow cylinder and bearing a continuous cam slot extending once round its periphery, said track having an axial excursion such as to cause a forward movement of the punch through its associated die and a corresponding retraction as the associated workpiece holder moves between the loading station and the discharge station, wherein each punch is provided with an axial bore containing a longitudinally slidable bolt, extending from a head normally flush with the head of the punch to a tail portion extending from the other end of the punch, means being positioned relative to the cam drum so as to engage the tail portions of each bolt as the cam follower of its associated punch passes beyond the maximum forward excursion of the cam slot on rotation of transport member, whereby to initiate stripping of a workpiece from the punch, and wherein a stripping ring is mounted for limited radial floating movement on the remote side of each die from the associated punch, said stripping ring being biased to a non radial position wherein it will engage a workpiece partially stripped from the punch.

2. Apparatus according to claim 1, wherein the dies are carried at the closed end of the hollow cylinder.

3. Apparatus according to claim 1, wherein the drum is situated within the hollow cylinder.

4. Apparatus according to claim 1, wherein the hollow cylinder is fast to and is adapted to be driven by a central shaft.

5. Apparatus according to claim 1, wherein the workpiece-loading station comprises a guide fixed in relation to the frame adapted to feed workpieces to the workpiece holders in a radial direction relative to the transport element.